(12) United States Patent
Sinha

(10) Patent No.: US 9,939,881 B2
(45) Date of Patent: Apr. 10, 2018

(54) POWER MANAGEMENT IN A CONFIGURABLE BUS

(71) Applicant: Avago Technologies General IP (Singapore) Pte. Ltd., Singapore (SG)

(72) Inventor: Rajesh Kumar Sinha, San Diego, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 501 days.

(21) Appl. No.: 14/040,099

(22) Filed: Sep. 27, 2013

(65) Prior Publication Data
US 2015/0082064 A1 Mar. 19, 2015

Related U.S. Application Data

(60) Provisional application No. 61/878,730, filed on Sep. 17, 2013.

(51) Int. Cl.
*G06F 1/00* (2006.01)
*G06F 1/32* (2006.01)
*H04W 52/02* (2009.01)

(52) U.S. Cl.
CPC .......... *G06F 1/3253* (2013.01); *G06F 1/325* (2013.01); *G06F 1/3209* (2013.01); *H04W 52/0251* (2013.01); *Y02B 60/1235* (2013.01); *Y02B 60/50* (2013.01)

(58) Field of Classification Search
CPC ........ G06F 1/3203; G06F 1/08; G06F 1/3215; G06F 1/324; G06F 1/325; G06F 11/3423; G06F 1/3237; G06F 1/3253; G06F 1/3287
See application file for complete search history.

(56) References Cited

U.S. PATENT DOCUMENTS

| | | | | |
|---|---|---|---|---|
| 5,497,497 A * | 3/1996 | Miller | ................... | G06F 9/4403 713/1 |
| 9,229,518 B1 * | 1/2016 | Pannell | ................. | G06F 1/3203 |
| 2006/0168457 A1 * | 7/2006 | Leech | ................... | G06F 1/3287 713/300 |
| 2007/0027485 A1 * | 2/2007 | Kallmyer | ................ | G06F 13/14 607/2 |
| 2007/0171858 A1 * | 7/2007 | Grandhi | .............. | H04W 74/002 370/328 |
| 2008/0232301 A1 * | 9/2008 | Cai | ....................... | H04L 1/0003 370/328 |
| 2008/0307093 A1 * | 12/2008 | Song | ...................... | H04L 12/12 709/226 |
| 2009/0268708 A1 * | 10/2009 | Lambrecht | ............. | H04L 12/43 370/347 |
| 2011/0235459 A1 * | 9/2011 | Ware | ....................... | G11C 7/04 365/233.11 |
| 2011/0320841 A1 * | 12/2011 | Sinha | ................... | G06F 1/3203 713/323 |

(Continued)

OTHER PUBLICATIONS

MIPI Alliance Standard for Serial Low-power Inter-chip Media Bus (SLIMbus™), Version 1.00.00, MIPI Alliance, Inc., Mar. 6, 2007, 217 pages.

*Primary Examiner* — Thomas Lee
*Assistant Examiner* — Zhipeng Wang
(74) *Attorney, Agent, or Firm* — Foley & Lardner LLP

(57) ABSTRACT

A system includes a bus and a component interconnected via the bus. The component may enter a sleep mode during a period of no data transmission involving the component.

20 Claims, 17 Drawing Sheets

(56) References Cited

U.S. PATENT DOCUMENTS

| | | | |
|---|---|---|---|
| 2014/0025853 A1* | 1/2014 | Fujita | G06F 13/405 |
| | | | 710/110 |
| 2014/0068287 A1* | 3/2014 | Teoh | G06F 1/3209 |
| | | | 713/310 |
| 2015/0029952 A1* | 1/2015 | Huang | H04L 1/0003 |
| | | | 370/329 |

* cited by examiner

POWER MANAGEMENT IN A CONFIGURABLE BUS

PRIORITY CLAIM

This application claims priority to U.S. Provisional Application Ser. No. 61/878,730, filed Sep. 17, 2013, which is incorporated herein by reference in its entirety.

TECHNICAL FIELD

This disclosure relates to mobile devices, and power saving in mobile devices.

BACKGROUND

Buses are used to interconnect various components within a device. A bus may support protocols for data transfer. Asynchronous data protocols allow for transmission of data at varied and may not require synchronization to a common clock. Isochronous data protocols provide for transmission of data at regular intervals and may be used in transmission of constant bit rate data. Various types of data may be sent between component including video and audio information.

DETAILED DESCRIPTION

Figure 1:
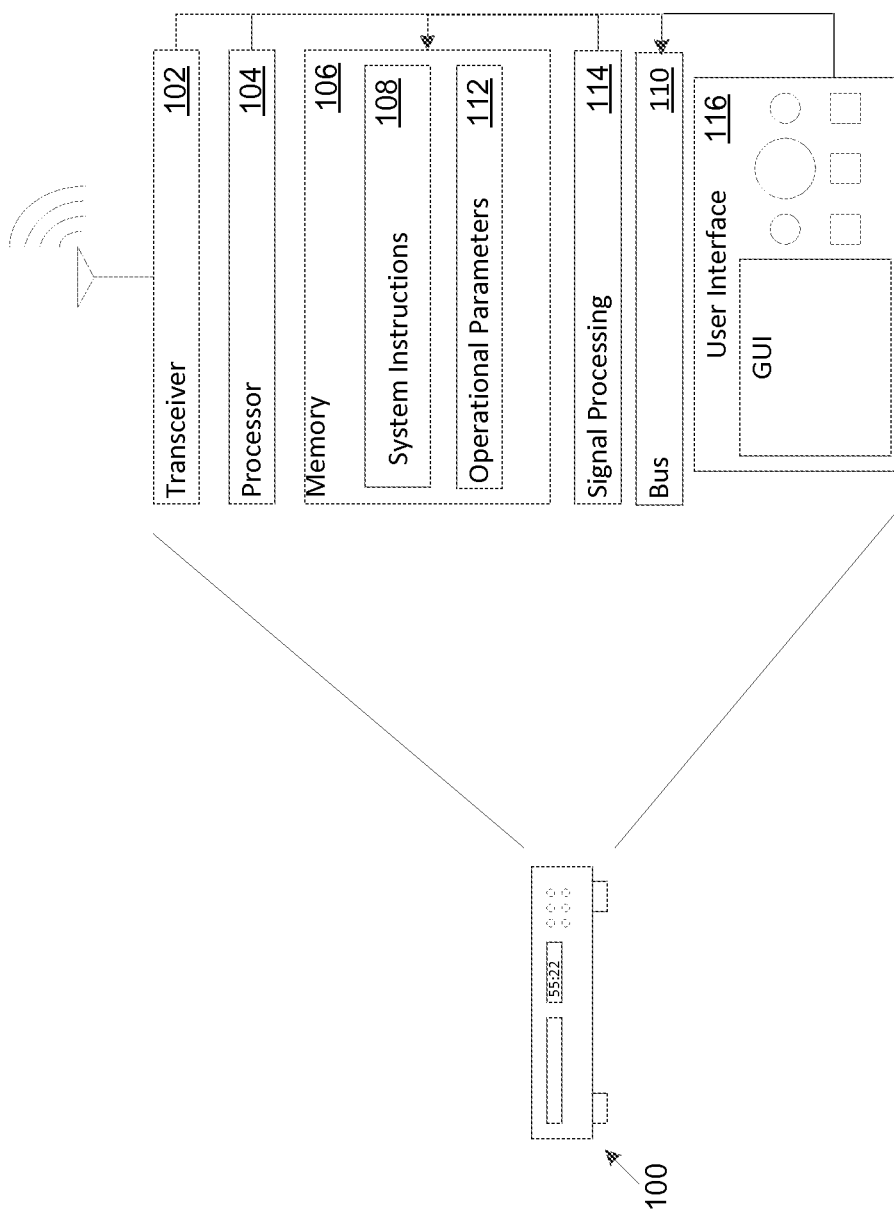
FIG. 1 is a functional block diagram of an example device.

FIG. 1 is a functional block diagram of an example device 100. In one example, the device is a communication device, such as a cell phone, smartphone, tablet, laptop, or a portable gaming system. However, the device may be virtually any device implementing internal bus communications. For example, cable or satellite television set-top boxes (STBs), or handheld computer systems may use such internal bus communications.

The device 100 may include transceiver elements 102 to support RF communication, one or more processors 104 to support execution of applications and general operation of the device. The device may include a bus 110 (e.g. a configurable bus, etc.) to interconnect components (e.g. processors 104, transceiver elements 102, memory 106, audio devices, basebands, user interface 116, etc.) onboard the device 100. The device 100 may include memory 106 for execution support and storage of system instructions 108 and operation parameters 112. Signal processing hardware 114 (e.g. ADC, baseband processors etc.) may also be included to support intra-device communications over the bus 110. The communication device may include a user interface 116 to allow for user operation of the various interconnected components of the device.

A configurable bus, (e.g. a Serial Low-power Inter-chip Media Bus (SLIMbus), etc.) may be implemented as an interface between baseband or application processors and peripheral components in mobile terminals.

In some implementations, a configurable bus may use a multi-drop bus structure to support multiple components. In addition, a configurable bus may implement messaging constructs to set up and manage data flow between components on the configurable bus. A bus may also allow for re-configuration of the bus operational characteristics on-the-fly to adapt to determined system operations.

In particular, a SLIMbus type bus may have the ability to simultaneously and efficiently carry multiple digital audio data streams at widely differing sample rates and bit widths.

In some cases, audio interfaces (e.g. PCM, I2S, SSI, or AC-97) may implement additional functions and digital audio channels by increasing the number of bus structures in the device. Some such interfaces may be point-to-point, and adding additional functionality to a device may involve the addition of a new bus structure. In some cases, it may be advantageous to implement a system in which additional functionality may be achieved with bus structures present on the device.

Further, additional bus structures may increase in pin counts within a device, device size, PCB layout area, and device power consumption.

In various implementations, a configurable bus (e.g. SLIMbus, etc.) may be used as a, robust, scalable, low-power, high-speed, cost-effective, two wire multi-drop interface that supports a wide range of digital audio and control solutions. In some cases, a configurable bus may obviate one or more digital audio interfaces.

Additionally or alternatively, a configurable bus can be implemented to assume the functionalities of some instances of digital control buses such as 120, SPI, or UART and/or GPIO, in a device. In some cases, flexible and/or dynamic assignment of bus bandwidth between digital audio and non-audio control and data functions may be implemented in the configurable bus.

A configurable bus may allow for the realization of multiple products within a product line with widely varying digital audio and user interface features. The products within the line may have similar underlying structures despite their divergent features.

Additionally or alternatively, a configurable bus may reduce the time-to-market and design cost of mobile devices by simplifying the interconnection of various functional products from different manufacturers. In some cases, the configurable bus may allow for the realization of these advantages by providing a framework for device creation.

In various implementations a configurable bus may allow for audio, data, bus and device control on a single bus and a reduced pin count which may result in a lower overall product cost.

In one example, a SLIMbus type configurable bus can support for more than ten components.

Additionally or alternatively a configurable bus may be implemented to support, multiple, high quality audio channels, concurrent sample rates on the configurable bus, efficient, host-less, peer-to-peer communication, and/or a standardized message set to support software reuse and interoperability.

In some implementations, a common digital audio clock and/or common system clock may be used. Additionally or alternative, a dynamic clock frequency may be implemented in a configurable bus clock to allow for the optimization of bus power consumption.

In various implementations, configurable buses, such as the SLIMbus, may use a multi-drop master-slave bus architecture. This architecture may be well suited for mobile devices such as smartphones, PDAs and tablets.

Figure 2:
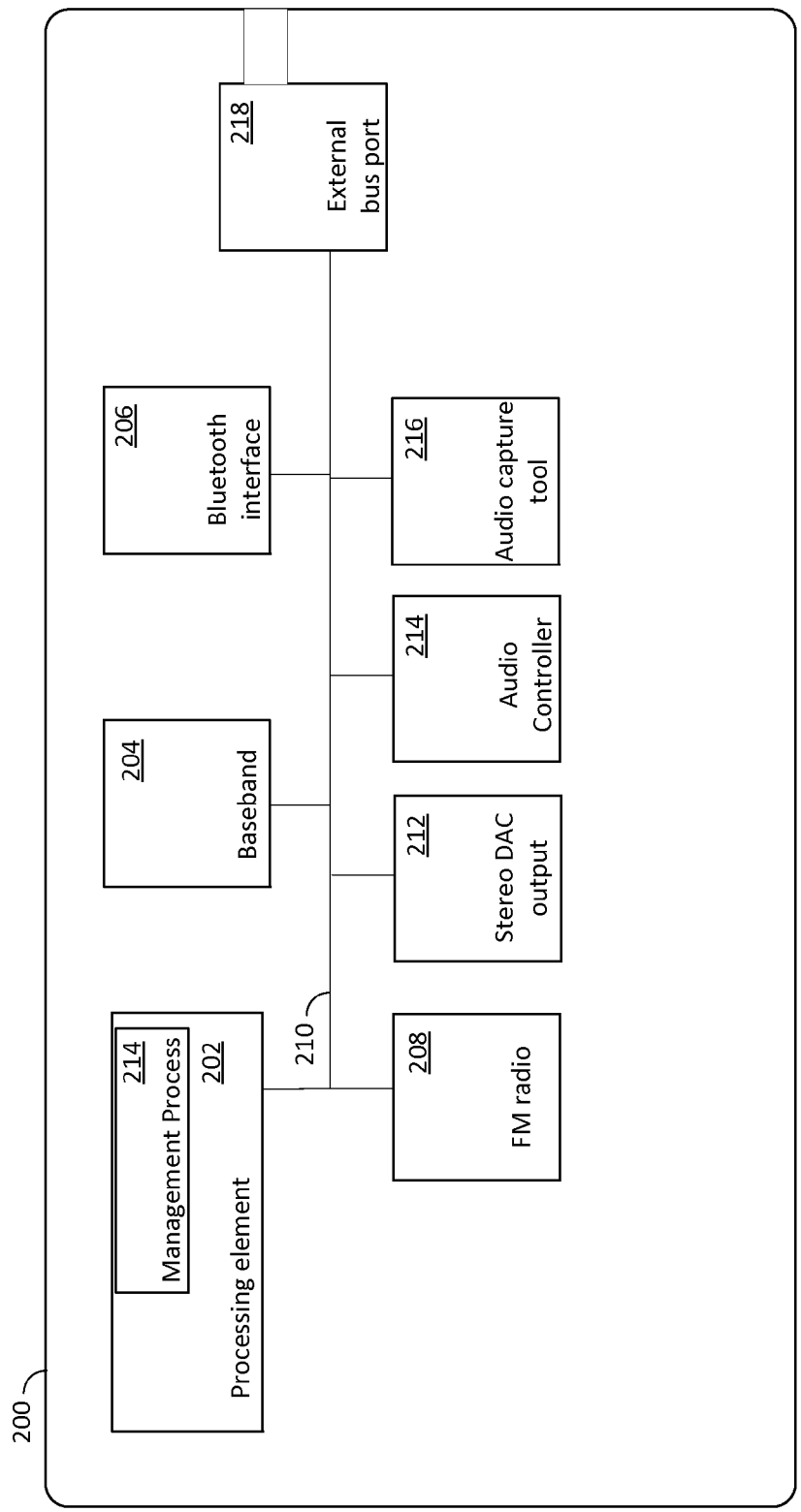
FIG. 2 is a functional block diagram of an example device.

FIG. 2 is a functional block diagram of an example device 200. In the example device, a processing element 202 is interconnected to components including a baseband processor 204, a Bluetooth interface 206, a FM radio 208, stereo output 212, and audio controller 214, an audio capture tool 216, and an external port 218. Additionally or alternatively, other devices (e.g. microphones, modems, data storage, Wi-Fi interfaces, user interfaces, displays, etc.) may be interconnected over the configurable bus 210. In the example device 200, the processing element 202 may run management processes 214 associated with the configurable bus. The example device 200 may support peer-to-peer communications over the configurable bus. Various components onboard the example device may exchange messaging directly over the bus. Additionally or alternatively, the management processes may facilitate and/or mediate inter-component messaging.

Battery power may be a limited resource for a portable device. In some cases, it may be advantageous to limit power usage on a device. For example, a long battery life device may have commercial success.

In various implementations a clock output may be transmitted over a clock line. The clock signal may be used by various components interconnected via the configurable bus.

Figure 3:
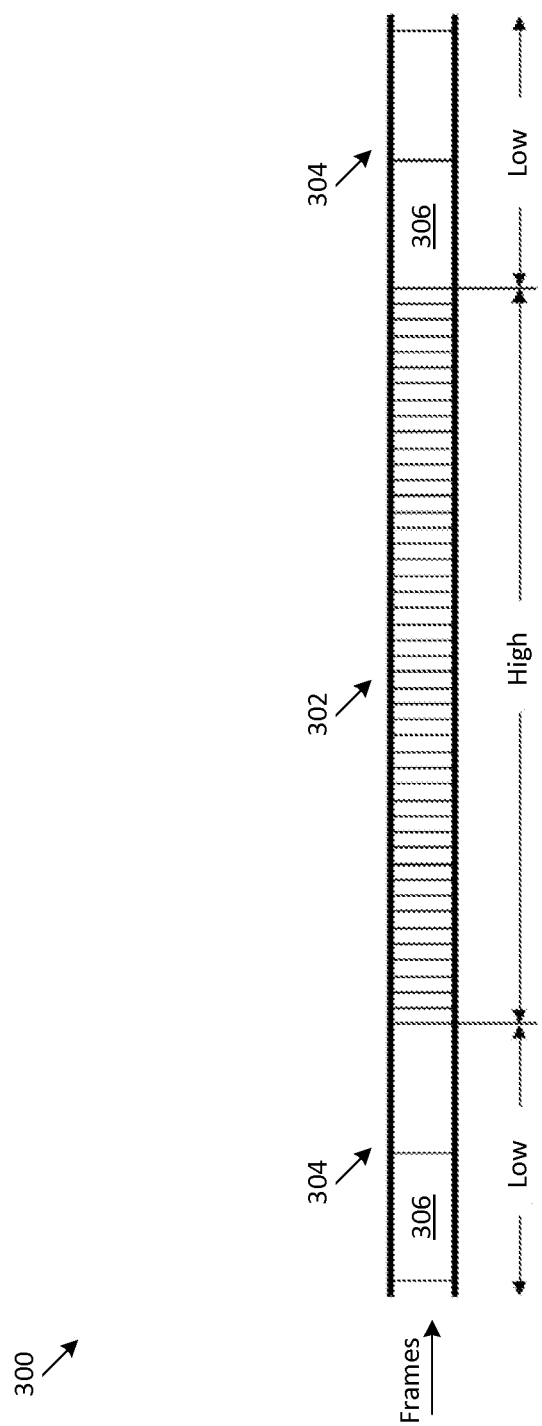
FIG. 3 is a timing diagram showing a configurable bus frame progression.

In some configurable buses, a clock frequency may be varied by changing a frame mode. FIG. 3 is a timing diagram showing a configurable bus frame progression 300. The configurable bus clock has multiple frame modes including a "high" 302 and a "low" 304 mode. The frames 306 are shorter in the "high" mode. In various, implementations, the frame mode may be varied while the clock is active. For example, the clock may be varied by management processes running on a processor of the device. Additionally or alternatively, other frame modes may be implemented. For example, the frame modes may be spaced such that the clock frequency may be varied by powers of 2. Namely, a subsequent frame mode may be twice the frequency of its predecessor (e.g. $f, 2f \ldots 2^{n-1}f$, where n is the available number of modes, and f is the frequency of the lowest frequency frame mode). Additionally or alternatively, other frame mode spacing may be used. In some cases, power consumption may be reduced by running the clock in a lower frequency frame mode. For example, the system may be configured to operate in the frame mode that matches the current usage of the processes currently active on a device. In some cases, operating the maximum frequency frame mode that may be used by a process on the device may be associated with larger power consumption levels.

In an example, the configurable bus may include a SLIMbus architecture. The clock frequency may include the superframe rate of the SLIMbus. The superframe rate of an active SLIMbus can be varied by changing the clock gear which may correspond to the changing the frame mode.

In some implementations, the clock may be paused and resumed. A clock may be paused and resumed through a request sent to a framer. In some cases, the framer may generate the clock signal. In such cases, the framer may include clock generation hardware such as oscillator circuitry. In some implementations, a framer may control clock operations and may not include clock signal generation hardware. A management process may request a framer (e.g. a framer scheduling process, clock signal generation hardware, a bus management component, or other management entity) to pause the bus clock by sending a clock pause request. For example, a clock pause request may include a NEXT_PAUSE_CLOCK message in a SLIMbus system. In some cases, pauses and resumptions may be associated with a reconfiguration sequence, which may be marked by a reconfiguration boundary.

In various implementations, components on the configurable bus may receive requests to change various parameters and options. The components may hold execution of the changes until a reconfiguration sequence is initiated. For example, a clock pause request may be sent. In some cases, the clock pause may not be initiated until a reconfiguration sequence is initiated after the clock pause request. Multiple change instructions may be executed together (or clubbed) by sending multiple change instructions followed by a reconfiguration sequence initiation. The reconfiguration sequence initiation may be sent by a component or a logical configurable bus entity (e.g. a management process, etc.).

Figure 4:
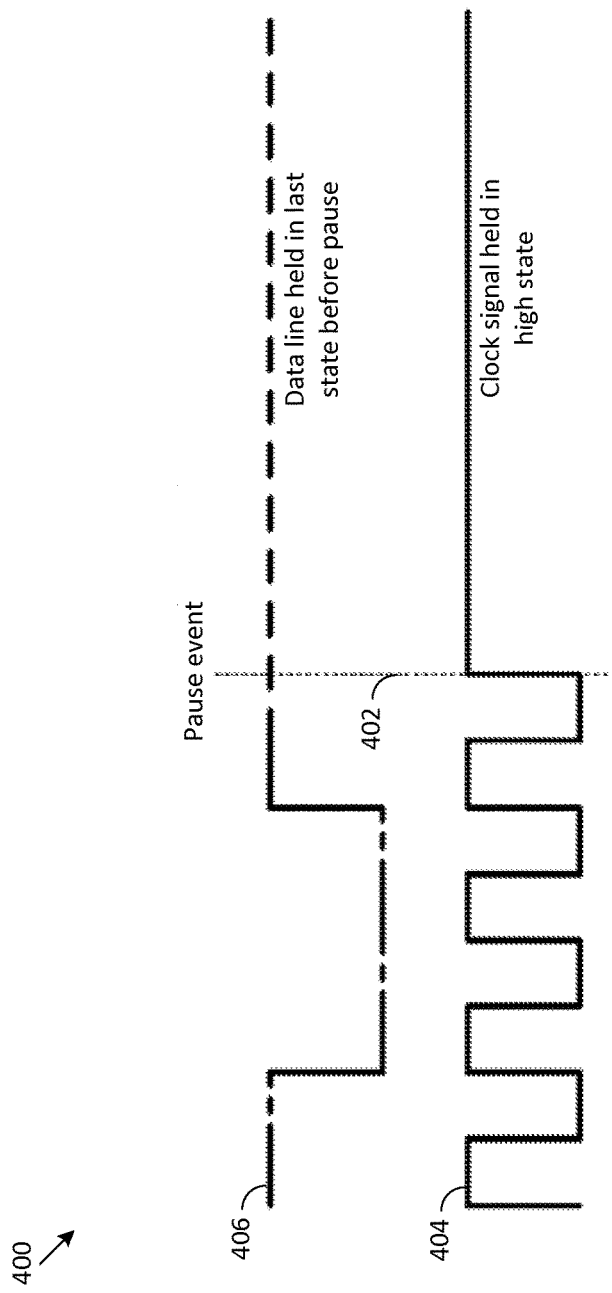
FIG. 4 is a timing diagram showing an example clock pause.

FIG. 4 is a timing diagram 400 showing an example clock pause. In the example, at a pause event 402 that clock signal is held in a logical high. A data line 406 may be held in a state the data signal was in at the time of the pause. In some implementations, a clock pause may result in the clock signal 404 being held at a logical low.

Figure 5:
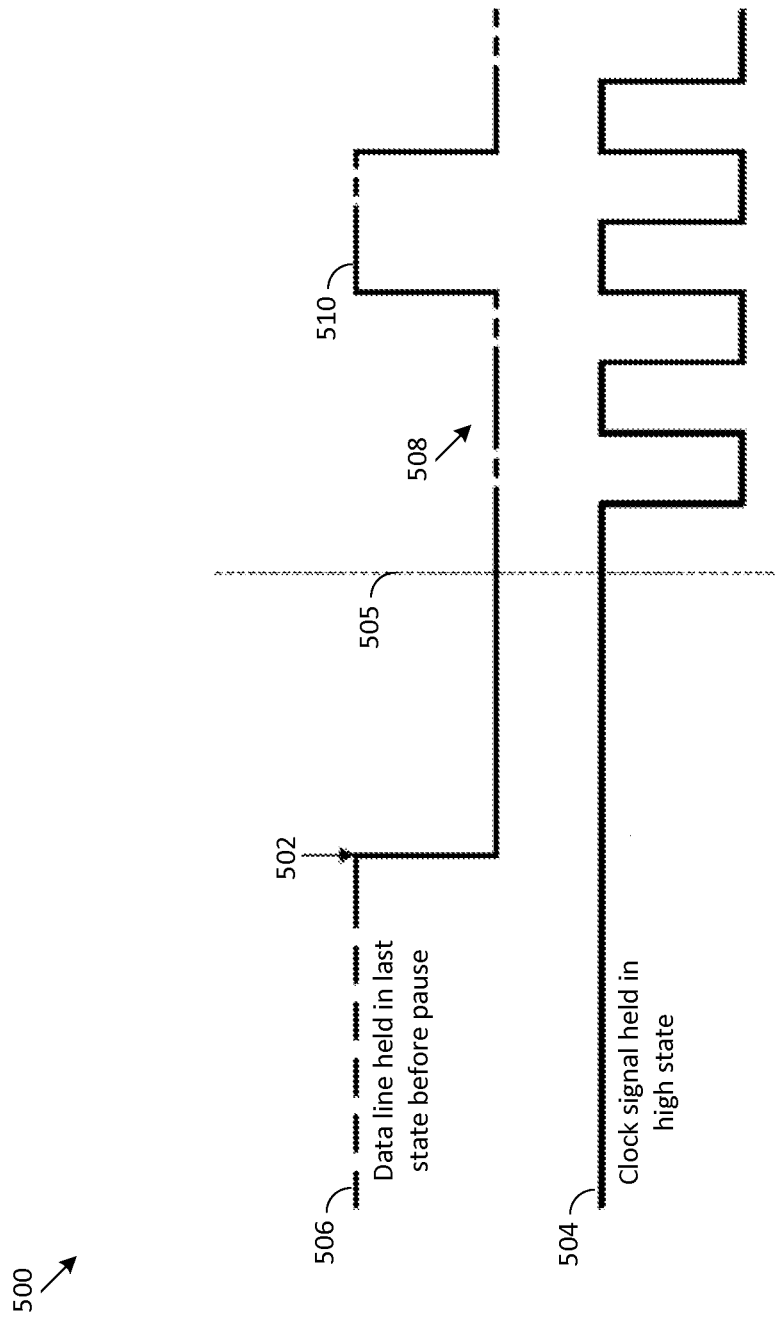
FIG. 5 is a timing diagram showing an example clock restart.

FIG. 5 is a timing diagram 500 showing an example clock restart. An activation 502 may be generated by component on the bus (e.g. management process on processor, bus activity request by peripheral, etc.). The clock signal 504 may resume at 505, and after an initial cycle 508 a first frame may be signified by a sync symbol 510 sent by a component (e.g. the activating component, or a management process on a processor, etc.) on the data line 506.

In some cases the component or process requesting the pause may transmit the messages to suspend activity on the configurable bus prior to pausing the bus. This may ensure that components or processes using the configurable bus may properly cease activity and may not cause undesirable operation.

In various implementations, a component may request by sending an inverted data signal. For example, the component may invert a transmission line associated with a data signal. In some cases, the framer may respond to the inverted signal by resuming the paused clock.

In some cases, a paused configurable bus may be associated with lower power consumption that the lowest active clock frame mode. A frame mode of the clock may be reduced when activity is present on the bus and the present activity has lower bandwidth usage than that supplied by the current frame mode. In some cases, a device with activity on its configurable bus may not pause the bus.

It may be advantageous to pause the configurable bus when no activity is present on the bus. In some cases, components interconnected by the bus may enter into a sleep mode (e.g. a low power or no power mode) when the bus is paused. Components in sleep mode may be associated with reduced power consumption.

In some cases, a component receiving asynchronous data may opportunistically sleep during times when the clock is paused. The component may wake from sleep when the clock signal is resumed. In some implementations, sleep synchronization may be executed. In some cases, data loss may not be incurred and with minimal latency may be experienced.

In various implementations, a component transmitting synchronous data (e.g. audio, video, etc.) can sleep opportunistically by bursting the data at higher rate. The component may sleep for a period until the synchronous transmission catches up.

In some implementations components may sleep when the configurable bus is active. Peer components may experience unchanged operation when various components on the configurable bus sleep.

Components that are configured for asynchronous transmission of data (i.e. source) may be aware of impending data transmissions by virtue of being a source. When a source lacks data to transmit, it may request the configurable bus clock to pause and/or it make go to sleep. The source can wake up and resume the clock when it has data to send. Component configured for asynchronous reception of data (i.e. sink) may have no knowledge of impending transmissions. Asynchronous data may arrive at a variety of times. To avoid data loss, a sink may remain awake.

In some implementations, a sink can opportunistically enter sleep when the configurable bus is paused by the source. In some cases, the sink can wake before the data transfer resumes, not incur data loss, and cause minimal latency overhead.

In various implementations, a sink can opportunistically enter sleep when the configurable bus is not paused and wake and may not incur data loss.

When a component enters sleep, it may power down clock generation, internal phase locked loops (PLLs) and control circuitry. When the component wakes, it may power up the clock, restart the PLLs and the control circuitry. These power up and power down processes may introduce latency (e.g. the component may take time to wake to a point where it may receive data). In some cases, a source may be unaware that a sink has entered sleep. It may be advantageous for the sink to wake to a point where it can receive data before data loss may occur from a source transmission.

Figure 6:
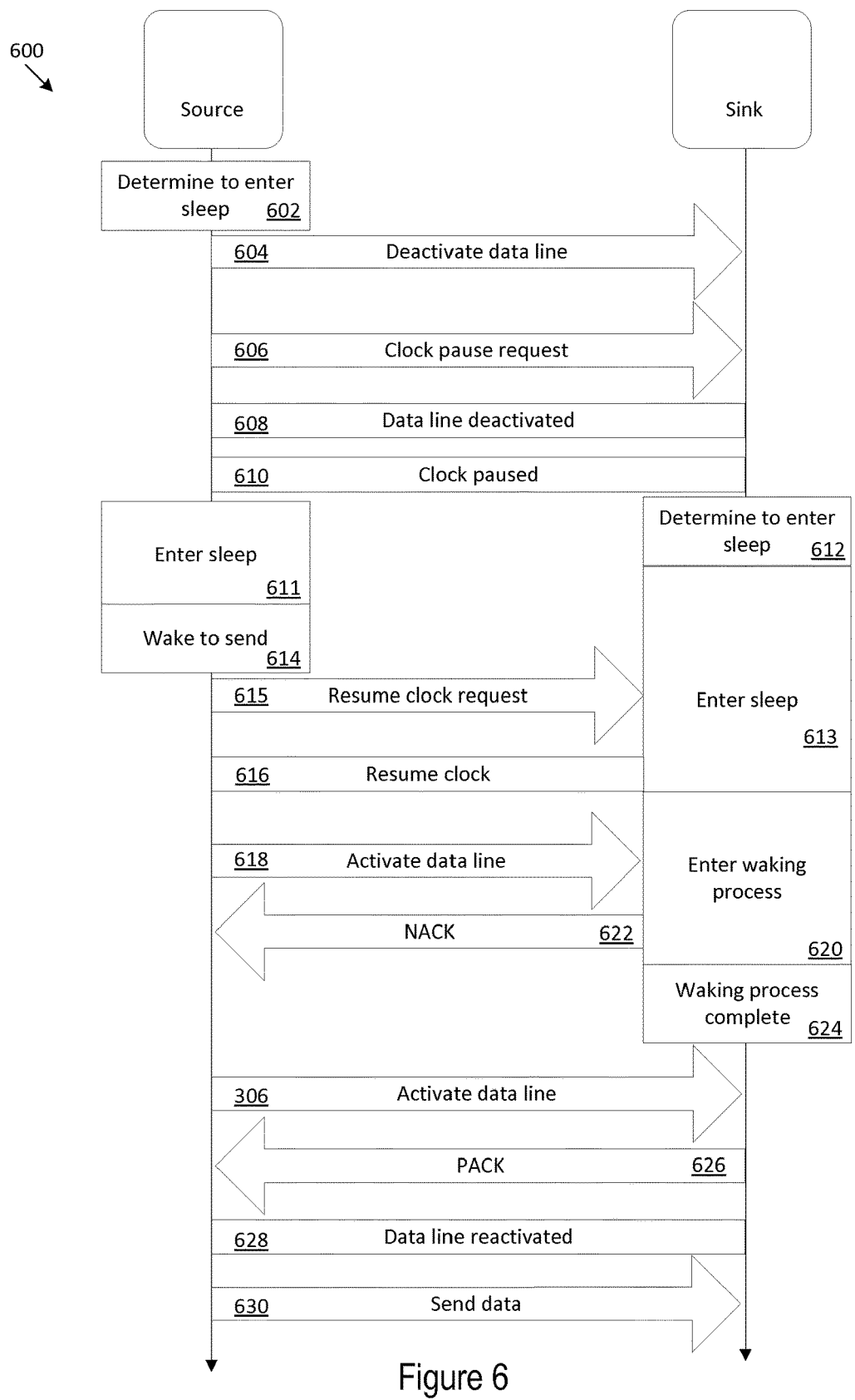
FIG. 6 is a ladder diagram of example logic for sink sleep.

FIG. 6 is a ladder diagram of an example logic 600 for sink sleep. A source may have no data to send and may determine to enter a sleep mode (602). When the source pauses the clock before entering sleep, the data line may be deactivated (608) before the clock is paused (610). For example, a message sequence of NEXT_DEACTIVATE_CHANNEL (deactivating the data line) followed by NEXT_PAUSE_CLOCK (pausing the clock) may be sent when pausing the clock. The source may enter sleep (611). When the sink receives the deactivate (604) and pause requests (606), it may determine to enter sleep (612) and enter sleep (613) and may not inform the source or another component on the configurable bus (opportunistic sleep). When the source wakes to send data (614), it may resume paused bus clock (616). The source may request activation of the data line (618). For example, a NEXT_ACTIVATE_CHANNEL message may be sent after the clock signal is resumed (616) and the configurable bus is active. When the sink detects that the clock is active it may begin a waking process (620). Since the waking process may result in the sink being unready for data reception before the source sends a message, the sink may respond to the request to active the data line (or other data) with a negative acknowledgement (NACK) (622) until the sink waking process is complete (624), or the sink is otherwise ready to receive data. For example, the sink may respond to the NEXT_ACTIVATE_CHANNEL message with a NACK. In some cases, the source may respond to the NACK by resending the data (e.g. the NEXT_ACTIVATE_CHANNEL message, etc.). The source may not resume data transmission until the data channel is active (628). In the example, because the NEXT_ACTIVATE_CHANNEL was responded to with a NACK, the data channel may remain inactive until the NEXT_ACTIVATE_CHANNEL message is responded to with a positive acknowledgement (PACK). In some cases, responding to the initial source data with a NACK may result in delaying the source data transmission until the sink is ready to receive the transmission. Data loss may be avoided via the delay. Once the waking process of the sink is complete, the sink may respond to the request to activate the data channel with a PACK (626). The data line may be reactivated in response to the PACK (628). The source may then resume the data transmission (630).

In some implementations, a sink may omit a response to a message in place of a NACK or PACK. Thus, to delay a source data transmission, the sink may not respond to the initial data transmission. Once the waking process has completed, the sink may respond with a PACK.

Figure 7:
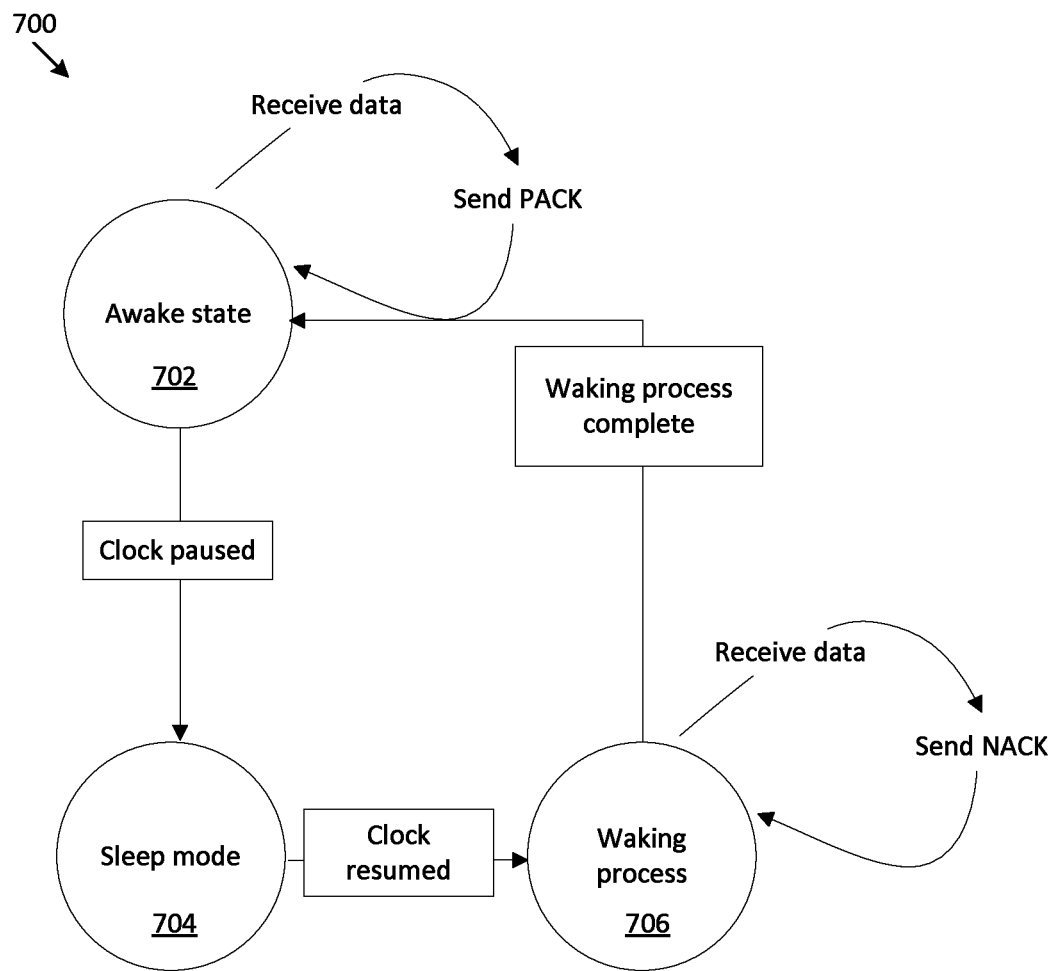
FIG. 7 is a state machine diagram of example logic for sink sleep.

FIG. 7 is a state machine diagram of example logic 700 for sink sleep. A sink may be in an awake state 702 and receive data from a source. In the awake state the sink may respond to source messages with a PACK. The source may determine to enter a sleep mode and pause the clock. In response to the paused clock, the sink may enter a sleep mode 704. The source may determine to exit the sleep mode and resume the clock. The sink may respond to the resumed clock by initiating a waking process 706. During the waking process 706, the sink may not be in the awake state 702 and may send a NACK in response to data or channel activation message from the source. Once the waking process 706 is complete, the sink may transition to the awake state 702. In various implementations the sink may start in the awake state 702, sleep mode 704, or the waking process 706.

In an example, the logic (e.g. 600, 700) may be applied for a SLIMbus-based mobile phone. The SLIMbus may interconnect a source including an application processor and a sink including a Bluetooth modem. The application processor may determine that there is no data to send to Bluetooth modem, and pause the SLIMbus clock signal. The Bluetooth modem may sleep in response to the paused clock. The application processor may wake upon determination that there is data to send to the Bluetooth modem. The application processor may request that the clock signal be resumed. The Bluetooth modem may begin waking in response to the clock signal resumption. The Bluetooth modem may send a NACK in response to received data or channel activation message from the application processor. Once the waking process of the Bluetooth modem is complete, the Bluetooth modem may send a PACK in response to data from the application processor.

Additionally or alternatively, other components may serve as source and sink. In some cases source and sink designations may change or reverse over time. For example, when external data is received by the Bluetooth modem, it may act as a source and the application processor may act a sink.

In various implementations, an asynchronous transport channel may be used in a point-to-point configuration between a source and a sink. When such a transport channel is established, the sink may be awake to receive data if the SLIMbus clock is not paused. In some cases, data loss may occur if the source transmits while the sink is in a sleep mode.

In some cases, the sink may enter a sleep state when the clock is not paused. In some cases, data transmission may be non-continuous or bursty on an asynchronous transport channel. A sink (or other component) can opportunistically enter a sleep mode during breaks in data transmission on the asynchronous channel with the clock not in a paused state. The sink may enter various levels of sleep (e.g. light sleep, medium sleep, deep sleep, or other low power mode). The various sleep levels may be associated with varying levels of power consumption and varying waking process durations. A determination of which level to enter may be based on the length of the breaks between data transmission (e.g. historical average, length of previous break, etc.). Additionally or alternatively, the determination of which level may be based on predetermined parameters (default settings, user input, mobile device state, etc.), application input (e.g. management processes, etc.), activities performed while in sleep mode, and/or source input.

Figure 8:
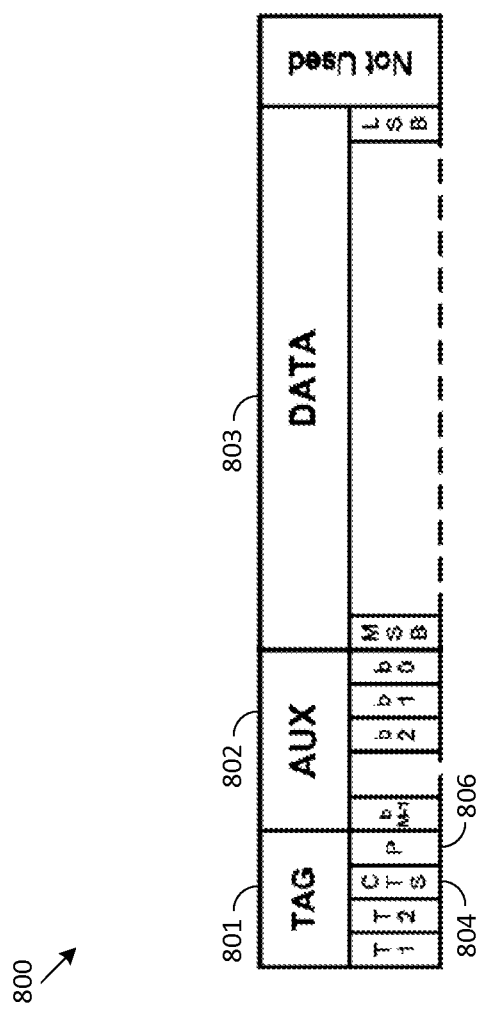
FIG. 8 is a functional block diagram of an example segment an asynchronous transport channel.

FIG. 8 is a functional block diagram of an example segment 800 an asynchronous transport channel. In various implementations, a segment may include one or more configurable frames allocated (e.g. via a time division multiple access scheme, etc.) to a component on a configurable bus. The segment 800 may include TAG field 801, AUX 802, and DATA 803 fields. In some implementations, the TAG field 801 may include a CTS (Clear-To-Send) bit 804 for flow control. The sink may set (e.g. set to "1") the CTS bit 804 to indicate that the sink is ready to receive data. The sink may clear (e.g. clear to "0") the CTS bit 804 to indicate that the sink is not ready to receive data. The source may stop sending data in response to a cleared CTS bit 804. The source may also set a flow control bit. For example, the source may set the P (Presence) bit 806 in the TAG field 801 to indicate there is data in that segment. When no data is present in a segment, the source may clear the P bit 806.

In some implementations, the sink may enter a sleep mode in response to a cleared P bit 806. In some implementations, the level of sleep selected by the sink may allow for reading the P bit and setting/clearing the CTS bit 804. The sink may then clear the CTS bit 804 for segments until it wakes from sleep and completes the waking process (e.g. ready to receive data). When the source determines to send data the source may set the P bit 806. The sink may initiate the waking process in response to the set P bit. The sink may continue to clear the CTS bit 804 until the waking process completes. Once, the waking process completes the sink may set the CTS bit 804. In some cases, the source may not place data on a segment until a predetermined number (e.g. 2) of set CTS bits 804 in consecutive segments are observed. In some implementations, the source may place data on a segment immediately following a set P bit 806 and a set CTS bit.

Figure 9:
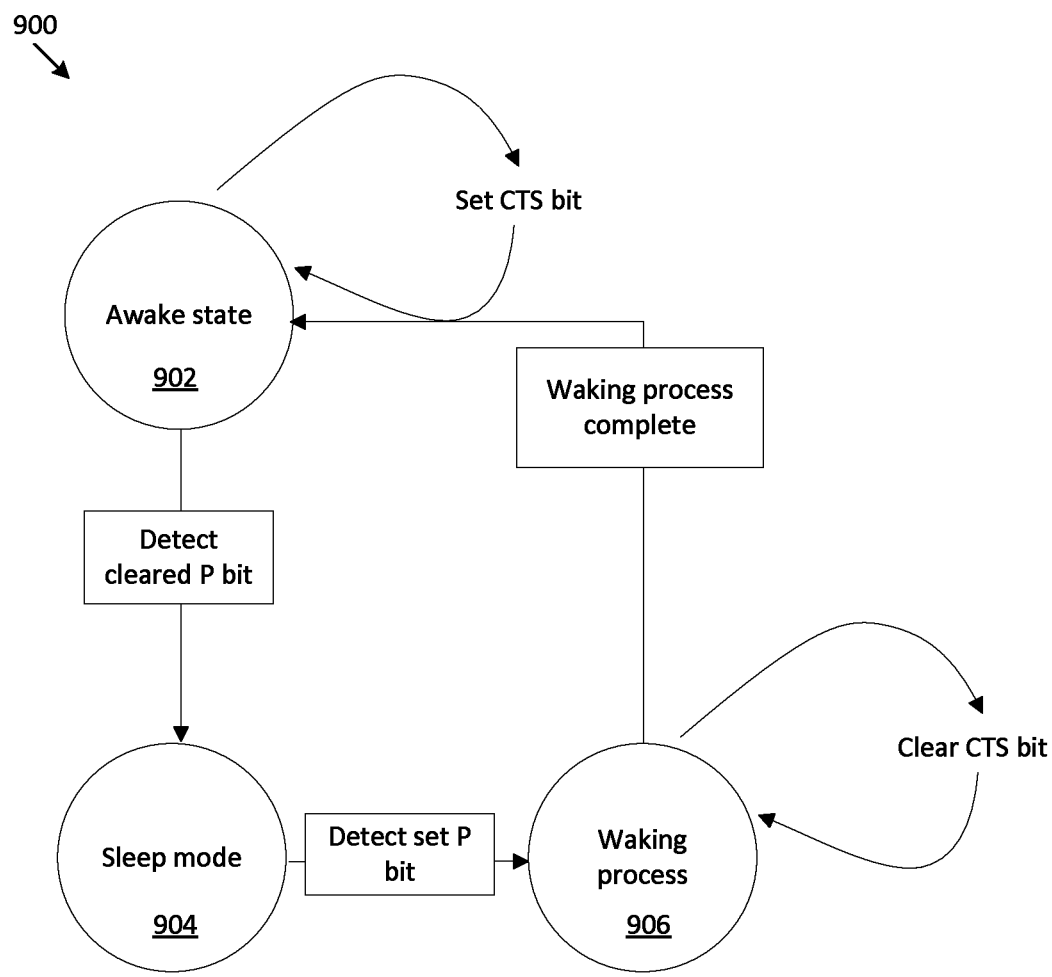
FIG. 9 is a state machine diagram of example logic for sink sleep.

FIG. 9 is a state machine diagram of example logic 900 for sink sleep. In an awake state 902, the sink may set the CTS bit 804 in segments. Upon detection of a cleared P bit 806 the sink may enter a sleep mode 904. In the sleep mode 904, the sink may monitor segments for a set P bit 806 and the sink may clear the CTS bit 804 in segments. Upon detection of a set P bit 806, the sink may initiate a waking process 906. During the waking process 906, the sink may clear the CTS bit 804. Once the waking process 906 completes, the sink may transition into the awake state 902 in which it may set CTS bits 804 in segments. Peer components may not receive indication of the state of the sink.

In various implementations other flow control bits may be used to indicate data and/or readiness to receive data. Additionally or alternatively, other segment or frame bit organizations may be used. For example, a frame or segment may include various fields and bits.

In some implementations, digital audio can be sent from one configurable bus component to another using an isochronous/pushed/pulled transport channel. For example, PCM audio with a sample rate of 48 KHz can be sent using a 48 KHz segment rate on an isochronous channel. PCM audio with a sample rate of 44.1 KHz can be sent over pushed channel with a 48 KHz segment rate.

During some isochronous/pushed/pulled transfers, it may be challenging for the source or sink of the data to enter a power saving mode. In some cases, idle times associated with isochronous/pushed/pulled transport channels may be short.

In some implementations, a source may intermittently sleep during an isochronous/pushed/pulled data transfer.

As discussed above, in some implementations the frame rate of a configurable bus may be varied. For example, some configurable buses may vary their frame rate in binary steps (i.e. doubling (or halving) the frame rate at the steps). At a higher frame rate, components on a configurable bus may transfer data at a higher rate.

In some implementations, a source may request the framer to increase a configurable bus clock. In some cases, the framer may be disposed on the source. The source may have data for consumption at a given rate (e.g. 48 KHz audio, video with a given bitrate, etc.). The source may request that the bus clock be increase beyond what may support the consumption rate of the data. The data may then be transferred in a burst. For example, an audio source may burst audio samples at higher segment rate (in an example SLIMbus, the source may transfer at ~9× of 48 KHz sample rate at a 19.2 MHz bus segment rate). Burst transfers may be associated with increased idle periods between data transfers. The source may then enter a sleep mode during the increased idle periods. The sink may buffer the burst transfer and consume the data at the prescribed rate. The source may also pause the configurable bus clock during an idle period. In some cases, the clock speed of the configurable bus may be affected by usage of components other than the source and sink.

For example, a smartphone may be equipped with a SLIMbus. An application processor and Bluetooth+FM+GPS Combo component may be interconnected via the SLIMbus. In some cases, FM audio sampled at 48 KHz may be routed to the BT+FM+GPS device from the application processor. The application processor may send burst audio samples so that the application processor may enter a sleep mode during increase idle periods. In some implementations, the processor may send burst data when other components interconnected by the SLIMbus are also in a sleep mode.

In various implementations, the burst transfer duration may depend on the burst transfer rate, which may depend on a burst buffer size on the sink. A larger burst buffer on the sink may support a higher transfer rate, which may be associated with shorter transfer durations and longer idle times (for a given amount of data).

In some implementations, a source may send burst data transfers until a sink responds with a buffer almost full indication. In various implementations, a source may send burst data transfers for a predetermined period of time and then may stop. In some implementations, the source may send burst data transfers until data no remaining data is left for transfer (e.g. transfer buffer empty).

Figure 10:
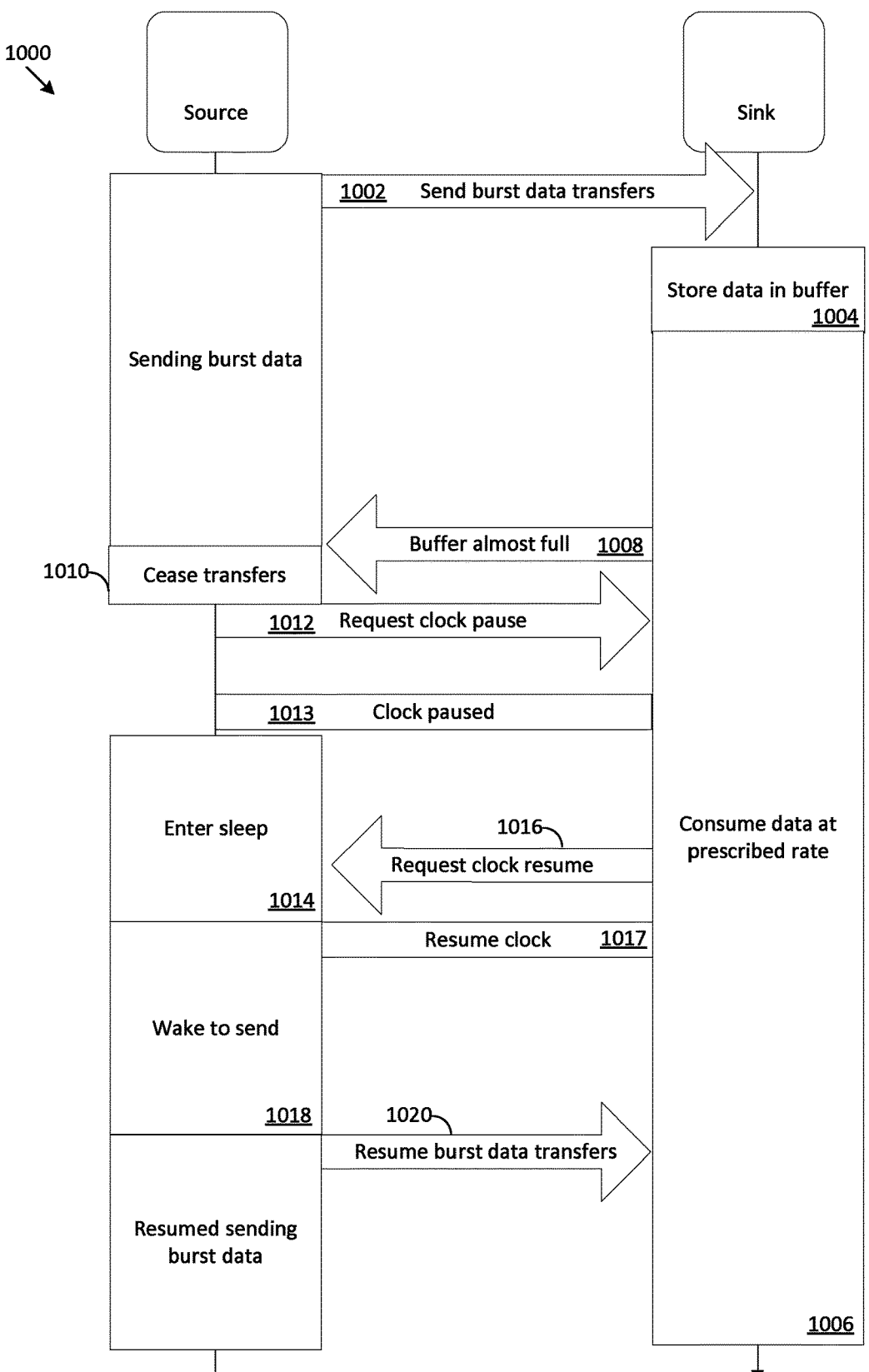
FIG. 10 is a ladder diagram of example logic for burst data transfer.

FIG. 10 is a ladder diagram of example logic 1000 for burst data transfer. A source may send burst data transfers (1002). A sink may receive the burst data transfers and hold some of the received data in a burst buffer (1004). The sink may consume the data at a prescribed rate (1006), which may be lower than the burst transfer rate. Once the burst buffer fills to a predetermined level, the sink may send a buffer almost full indication (1008). The source may cease burst transfers (1010). The source may request to pause the clock (1012). The clock may pause (1013). The source may enter a sleep mode (1014). When the sink consumes the data such that the burst buffer reaches a predetermined low level, the sink may request to resume the clock (1016), and the clock may resume (1017). In response to the clock resume request and/or a buffer almost empty indicator from the sink, the source may wake (1018). The source may resume burst data transfers (1020).

Figure 11:
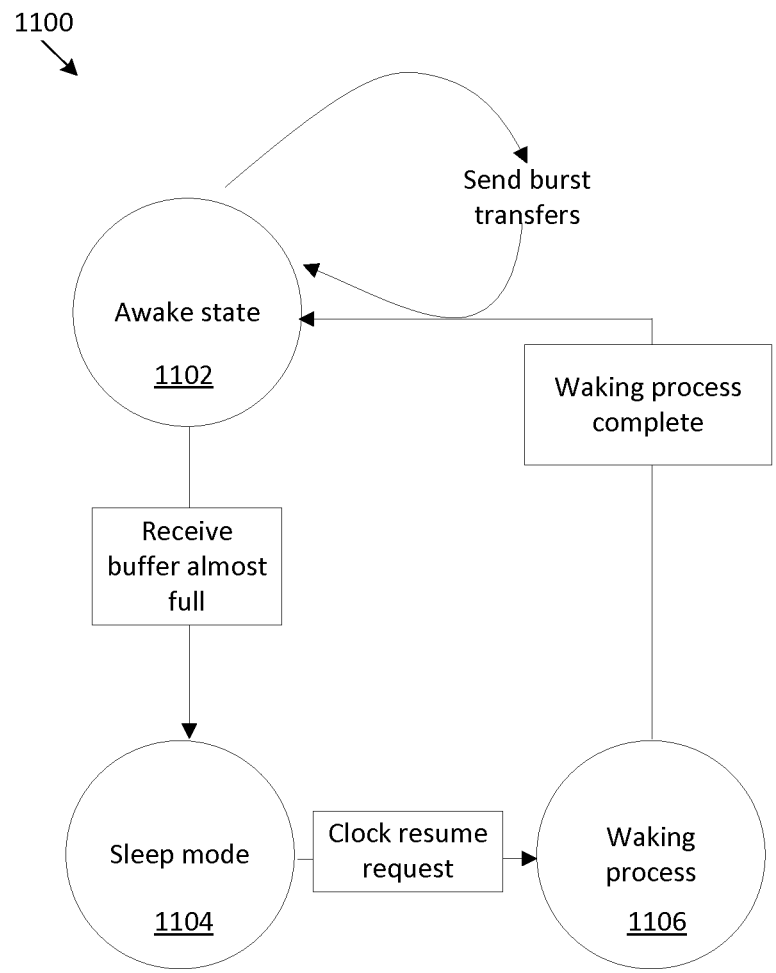
FIG. 11 is a state machine diagram of example logic for burst data transfer.

FIG. 11 is a state machine diagram of example logic 1100 for burst data transfer. A source may send burst data transfers in an awake state 1102. The source may receive a buffer almost full indicator. In response to the buffer almost full indicator, the source may stop sending burst data transfers, request to pause the clock, and enter a sleep mode 1104. While in sleep mode, the source response to a request to resume the clock and/or a buffer almost empty indicator by initiating a waking process 1106. Once, the waking process 1106 is complete, the source may return to the awake state 1102.

Figure 12:
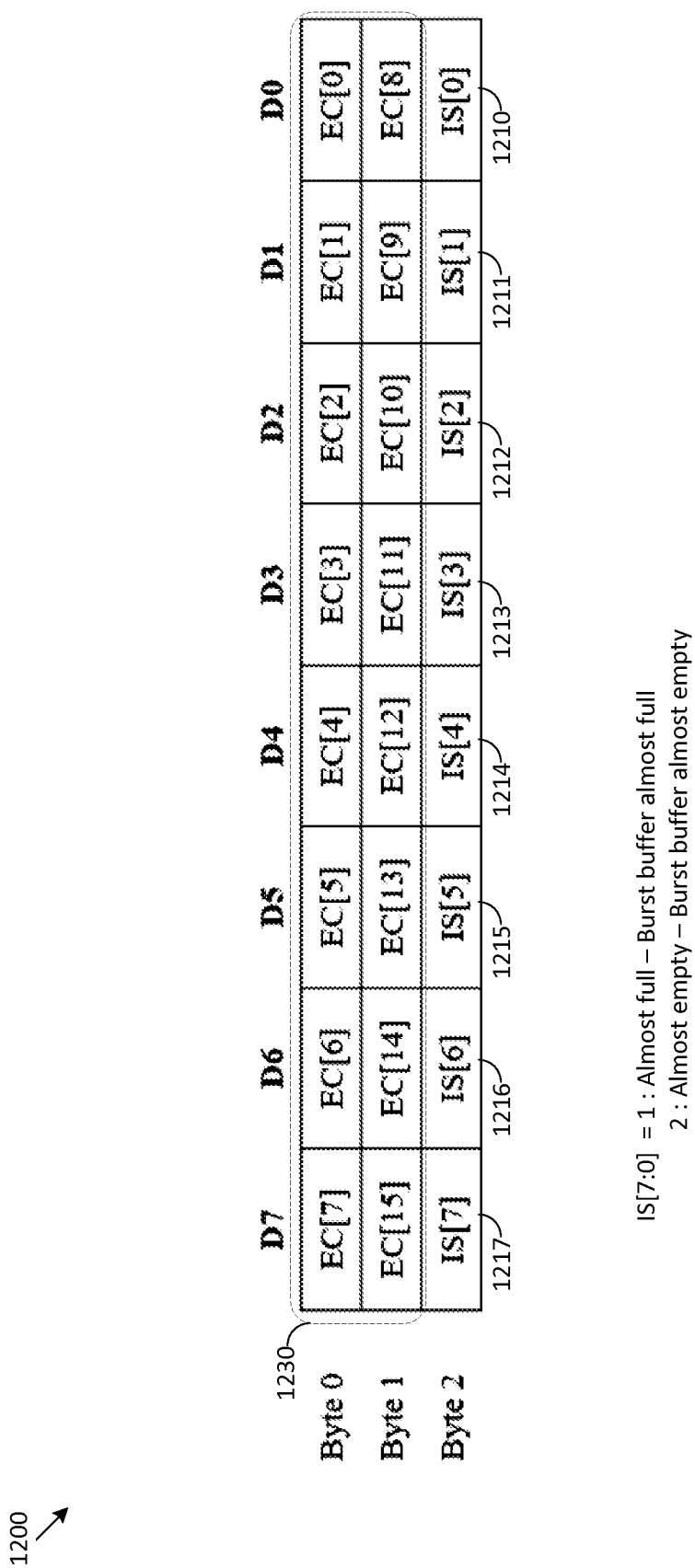
FIG. 12 is a table of an example bit layout for a REPORT_INFORMATION message.

In some implementations, a vendor specific code may be used as a buffer status indicator (e.g. buffer almost full indicator, a buffer almost empty indicator, etc.). For example, in a SLIMbus system, a REPORT_INFORMATION message may be used to send information about one component to another component on a SLIMbus. FIG. 12 is a table of an example bit layout 1200 for a REPORT_INFORMATION message. Byte 2 1202 includes IS (information slice) bits 1210, 1211, 1212, 1213, 1214, 1215, 1216, 1217. Setting IS[1] 1211 and clearing other IS bits 1210, 1212, 1213, 1214, 1215, 1216, 1217 may serve as a buffer almost full indicator. Setting IS[2] 1212 and clearing other IS bits 1210, 1211, 1213, 1214, 1215, 1216, 1217 may serve as a buffer almost empty indicator. In various implementations, EC (element code) bits 1230 may be set or cleared by other applications. EC bit states may not affect the status of the buffer status indicator. In various implementations, other buffer status indicators and indicator coding schemes may be used. For example, indicators may be tied to other IS or EC bits or other messages. Additionally or alternatively, other indicators may be sent such as buffer full, buffer empty, entering sleep mode, exiting sleep mode.

In some implementations, a buffer status indicator may be sent from the sink to the source. In some cases, sending such an indicator may be associated with increased overhead and/or system latency.

In various implementations, a buffer status indicator may not be sent. In some cases, the duration of burst transfer time (Tburst) that may not exceed a burst buffer capacity may be determined. In some cases, duration of Tburst may be determined by the source. In some cases, the Tburst duration may be pre-programmed (e.g. set) by higher layers (e.g. application layer, etc.) and/or pre-defined parameters of the source. The source may send burst transfers for the time Tburst and then hold the burst transfers. The source can then enter sleep. The sink may consumer the data at the prescribed rate.

Upon reaching a buffer almost empty level, the sink may request the clock be resumed. In some implementations, the sink may request the resumption by inverting a data line. Upon detecting the resumption request and/or in response to the resumption of the clock, the source may return to an awake state and resume sending burst transfers.

Figure 13:
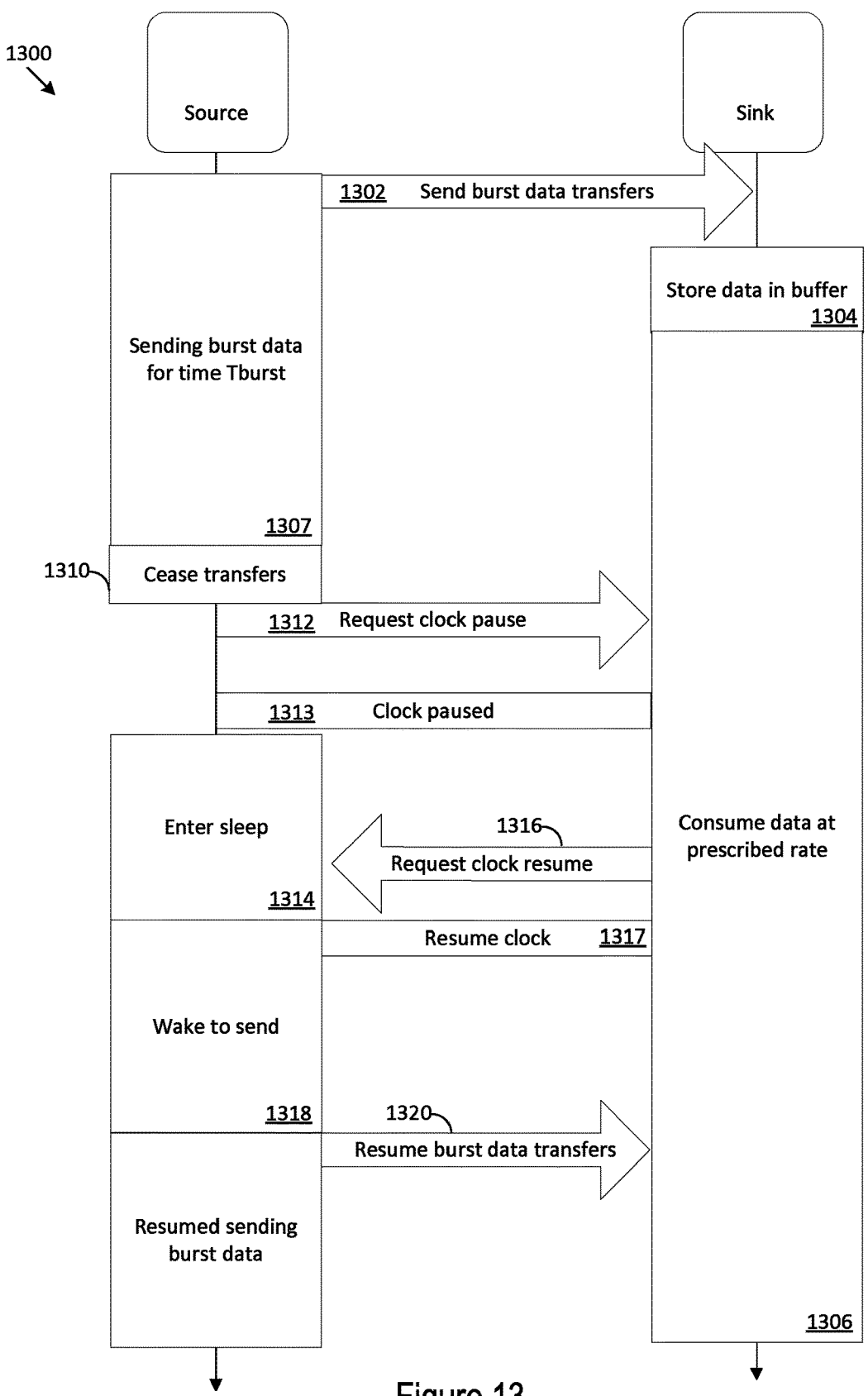
FIG. 13 is a ladder diagram of example logic for burst data transfer.

FIG. 13 is a ladder diagram of example logic 1300 for burst data transfer. A source may send burst data transfers (1302). A sink may receive the burst data transfers and hold some of the received data in a burst buffer (1304). The sink may consume the data at a prescribed rate (1306), which may be lower than the burst transfer rate. The source may send burst transfers for a time Tburst (1307). Once a time Tburst elapses, the source may cease the burst transfers (1310). The source may request to pause the clock (1312), and the clock may pause (1313). The source may enter a sleep mode (1314). When the sink consumes the data such that the burst buffer reaches a predetermined low level, the sink may request to resume the clock (1316). The clock may resume (1317). In response to the clock resume request, the source may wake (1318). The source may resume burst data transfers (1320).

Figure 14:
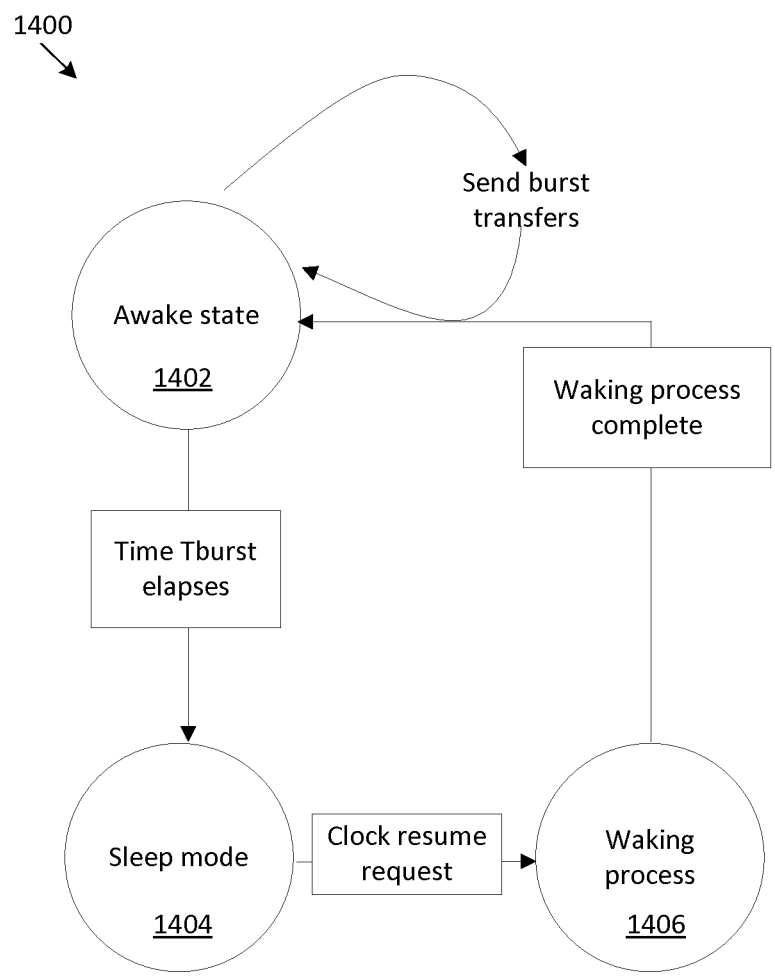
FIG. 14 is a state machine diagram of example logic for burst data transfer.

FIG. 14 is a state machine diagram of example logic 1400 for burst data transfer. A source may send burst data transfers in an awake state 1402. After time Tburst, the source may stop sending burst data transfers, request to pause the clock, and enter a sleep mode 1404. While in sleep mode, the source response to a request to resume the clock by initiating a waking process 1406. Once, the waking process 1406 is complete, the source make return to the awake state 1402.

In some implementations, the waking process may be initiated by the source. For example the source may sleep for a duration (Tsleep), and then begin a waking process. Tsleep may be set based on the duration of Tburst and the consumption rate. In some cases, the source may enter sleep in response to a buffer almost full indication and the sleep for Tsleep and then being the waking process. In some cases, the waking process may begin after Tsleep and the sink may not send a buffer almost empty indicator.

Figure 15:
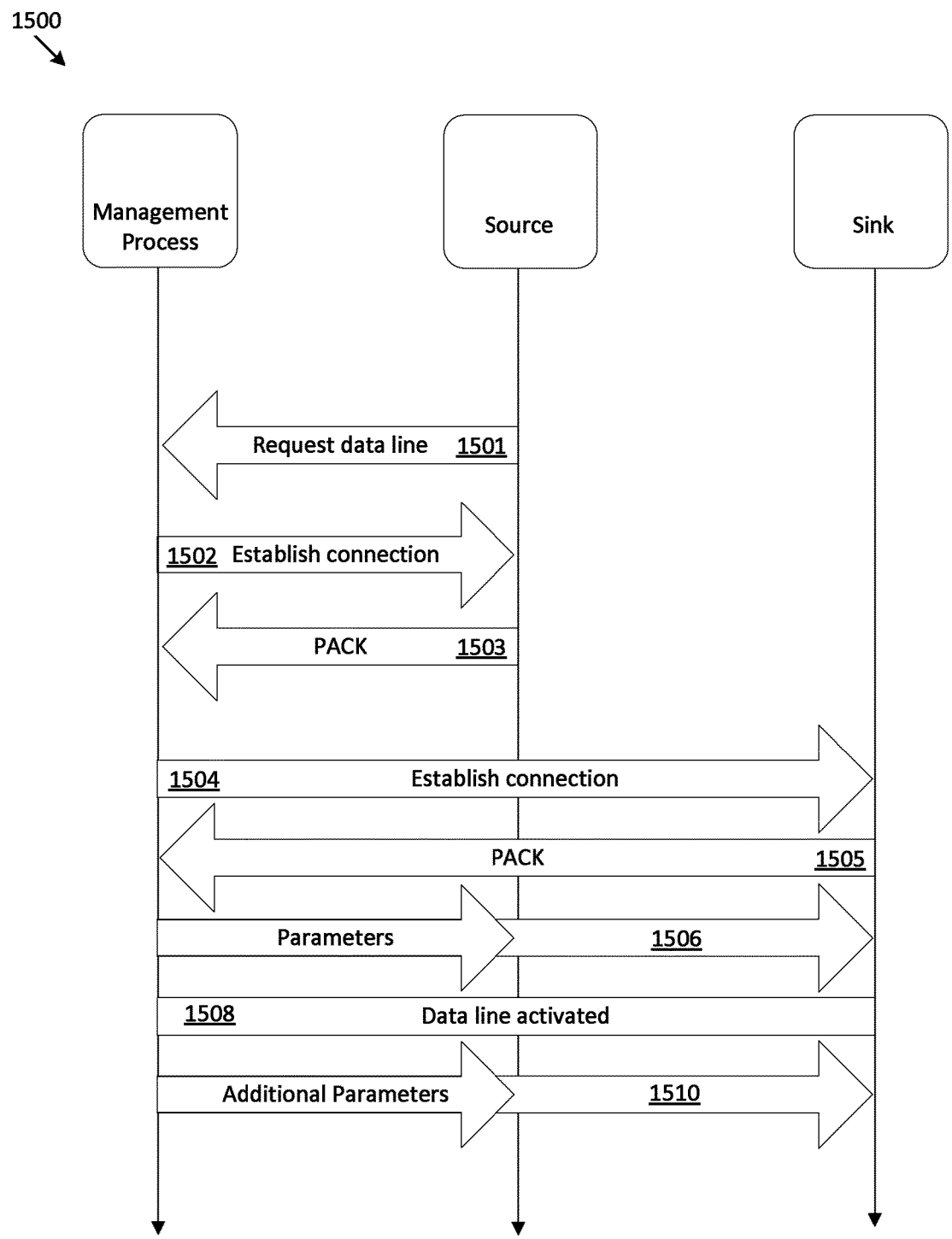
FIG. 15 is a ladder diagram of example logic for initialization of a data line.

In some implementations, prior to data transfers between a source and sink a data line between the source and sink is created. A management process (e.g. an active manager on a SLIMbus), may initiate a data line and communicate the relevant parameters to the components associated with the data line. FIG. 15 is a ladder diagram of example logic 1500 for initialization of a data line. A source may request a data line between the source and a sink (1501). The management process may establish a connection to the source (1502). The source may send a PACK (1503). The management process may establish a connection to the sink (1504). The sink may send a pack (1505). The data line parameters may be sent to the source and sink from the management process (1506). The management process may then activate the data line (1508). In some implementations, the management process may send additional parameters to the source and sink after activation of the data line (1510).

In some implementations, the data line may include an allocation (or other reservation of bandwidth). The data line may be logical entity of the configurable bus and may not be a dedicated hardware transmission line. In some cases, a time division multiple access (TDMA) scheme may be used to implement a logical data line. The data line may include a collection of periodic (or aperiodic) TDMA allocations. Other allocation schemes may be implemented (e.g. frequency division multiple access, frequency-time division multiple access, etc.).

In various implementations, the sink can opportunistically enter a sleep mode when the sink has no associated data lines and wake when the management process sends messages to configure the data line. This may occur before the source begins a data transmission. While the sink is in sleep mode, the configurable bus clock may be active or paused depending on the activity state of other components. In some cases, the sink may enter sleep and may not send sleep indications to peer components. In various implementations, components may act as a source and/or as a sink at various intervals. A component capable of receiving data that has no associated data lines may opportunistically enter a sleep mode in this manner.

Figure 16:
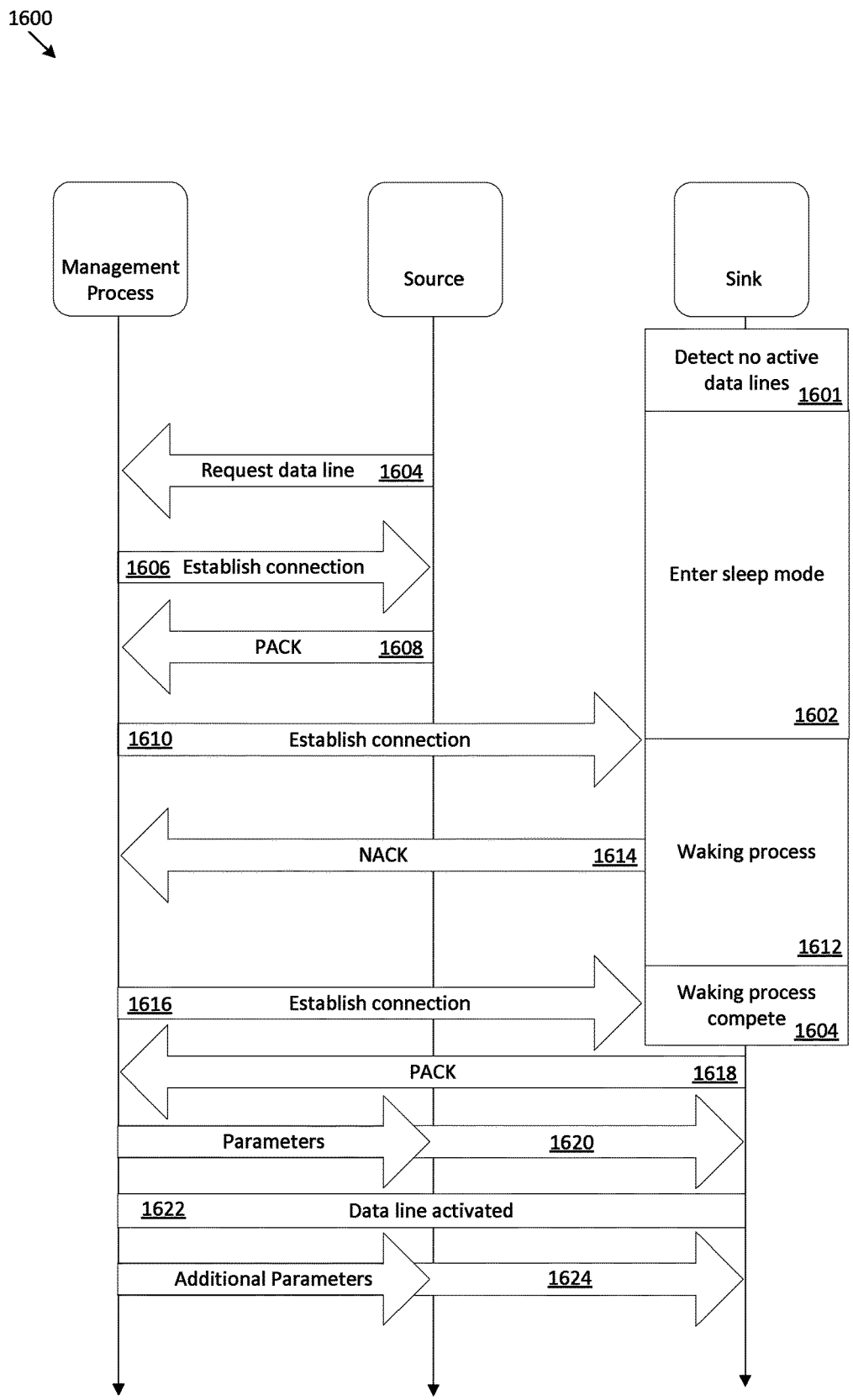
FIG. 16 is a ladder diagram of example logic for initialization of a data line.

In some implementations, the sink may respond to data line initialization messages with a NACK. FIG. 16 is a ladder diagram of example logic 1600 for initialization of a data line. A sink may detect no active data lines (1601) and may opportunistically enter a sleep mode (1602). A source may request a data line between the source and a sink (1604). A management process may establish a connection to the source (1606). The source may respond with a PACK (1608). The management process may establish a connection to the sink (1610). The sink may initiate a waking process (1612) and respond with a NACK (1614). The sink may continue to NACK until the waking process completes. The one or more NACKs during the waking process may inhibit the creation of the data line between the source and sink. This may ensure no data is sent by the source until the waking process of the sink completes. Once the waking process of the sink has completed (1615), the sink may respond to a subsequent connection establishment (1616) with a PACK (1618). The data line parameters may be sent to the source and sink from the management process (1620). The management process may then activate the data line (1622). In some implementations, the management process may send additional parameters to the source and sink after activation of the data line (1624). The sink may avoid data loss. In some cases, the source may be in a sleep mode when the connection establishment is received. The source may not send a NACK, because data transfer may not commence until initiated by the source.

Figure 17:
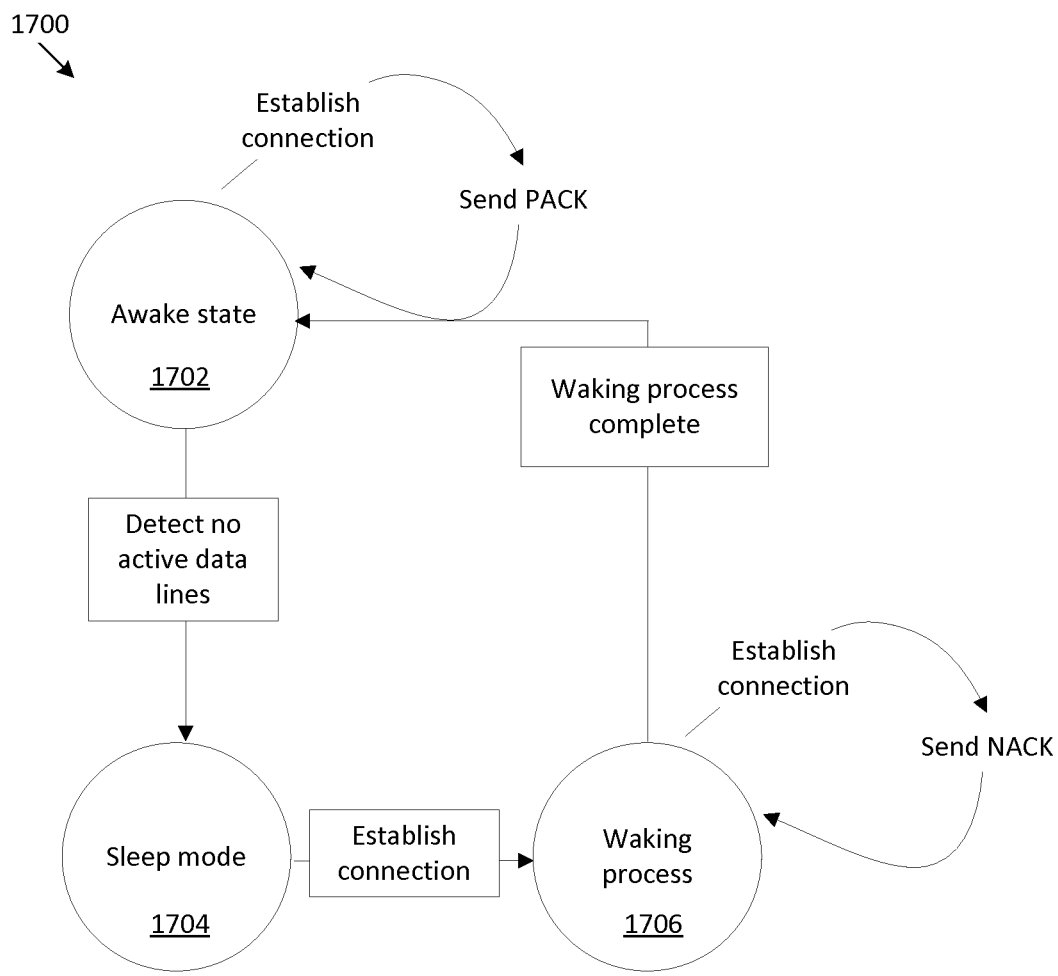
FIG. 17 is a state machine diagram of example logic for data line initialization.

FIG. 17 is a state machine diagram of example logic 1700 for data line initialization. A sink may be in an awake state 1702 and have all associated data lines deactivated. The sink may enter a sleep mode 1704 in response to the absence of associated data lines. A management process may send a data line establishment message to the sink. In response to the data line establishment message, the sink may send a NACK and initiate a waking process 1706. During the waking process 1706, the sink may respond to data line establishment messages with a NACK. Once the waking process 1706 completes, the sink may enter an awake state 1702. In the awake state 1702, the sink may respond to data line establishment messages with a PACK.

In various implementations, a data line may include a TDMA allocation. In some cases, a during period between a first allocation associated with a data line and a second allocation associated with the data line a source (and/or sink) associated with that data line may opportunistically sleep during the period. Further, a management process associated with the allocation for the data line may aggregate allocations to increase the length of periods where an allocation associated with the data line may not be present. This may allow for an increased length of periods for opportunistic sleep. Aggregating allocations may increase the latency of the data line. Increasing the length of periods for opportunistic sleep may reduce power consumption.

In various implementations, a component may request a clock pause. In some cases, other components may be actively using the configurable bus. A clock pause may be unavailable when other components are actively using the configurable bus. In some cases, a clock frequency reduction may be implemented when a clock pause is unavailable. A clock frequency reduction may reflect the reduced bandwidth usage that may have triggered the clock pause request. For example, example logics 600, 700, 1000, 1100, 1300, 1400 may implement a clock frequency reduction when a clock pause is unavailable.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

Various implementations have been specifically described. However, many other implementations are also possible.

What is claimed is:
1. A system, comprising:
bus interface circuitry configured to interconnect to a bus; and
a component, coupled to the bus interface circuitry, the component comprising circuitry configured to:

responsive to a bus state of the bus, determine a period comprising a start and an end during which no data is sent to the component;

upon detection of a cleared presence bit by the component, cause the component to enter a sleep mode during the period, the cleared presence bit indicating that no data is present for the component; and responsive to a set presence bit in a first received frame at the component, cause the component to initiate a waking process, the waking process comprising continually clearing a set value of a clear-to-send bit in a first sent frame until after the end of the period, the set presence bit indicating that there is data for the component; and after clearing the set value of the clear-to-send bit in the first sent frame, indicate that the period has completed and the waking process has completed by allowing the set value of the clear-to-send bit to remain set for a predetermined number of consecutive sent frames.

2. The system of claim 1, where the circuitry is further configured to determine the start of the period responsive to a clock pause sent over the bus.

3. The system of claim 2, where the component is configured to receive the clock pause in response to a completion of a data transmission.

4. The system of claim 1, where the circuitry is configured to determine the start of the period responsive to a flow control field, the flow control field included in a second received frame sent via the bus.

5. The system of claim 4, where:
the flow control field comprises the cleared presence bit; and
the second received frame comprises a SLIMbus-compliant message, the cleared presence bit configured to indicate the start of the period.

6. A method, comprising:
determining a period in which no data is sent to a component over a bus period responsive to an asserted presence bit in a first received frame;
upon detection of a presence bit being in a first state indicating that no data is present for the component, causing the component to enter a sleep mode during the period;
upon detection of the presence bit being in a second state indicating that there is data for the component, causing the component to initiate a waking process, the waking process comprising continually clearing a set value of a clear-to-send bit in a first sent frame until an end of the period; and
after clearing the set value of the clear-to-send bit in the first sent frame, indicating that the period has completed and the waking process has completed by allowing the set value of the clear-to-send bit to remain set for a predetermined number of consecutive sent frames.

7. The method of claim 6, where the bus period is for a bus and the bus comprises a configurable bus.

8. A product comprising:
a machine-readable medium other than a transitory signal; and
instructions stored on the machine-readable medium, the instructions, when executed, configured to cause a processor to:
determine a period in which no data is sent to a component over a bus;
upon detection of a cleared presence bit indicating that no data is present for the component, cause the component to enter a sleep mode during the period;
while the component is in the sleep mode, determine that the component is not ready to receive a transmission over the bus; and
responsive to an asserted presence bit in a first received frame indicating that there is data for the component, cause the component to initiate a waking process, the waking process comprising continually clearing a set value of a clear-to-send bit in a first sent frame; and
after clearing the set value of the clear-to-send bit in the first sent frame, indicating that the period has completed and the waking process has completed by allowing the set value of the clear-to-send bit to remain set for a predetermined number of consecutive sent frames.

9. The product of claim 8, where the instructions are further configured to cause the processor to determine a start of the period responsive to a clock pause sent over the bus.

10. The product of claim 9, where the instructions are further configured to cause the processor to receive the clock pause in response to a completion of a data transmission.

11. The product of claim 8, where the instructions are further configured to cause the processor to determine a start of the period responsive to the cleared presence bit within a second received frame.

12. The method of claim 6, where determining the period comprises determining a start of the period responsive to a cleared presence bit within a second received frame.

13. The system of claim 1, where the bus is configured to support burst-mode transfers.

14. The system of claim 13, where the period comprises a break in transmission created by opportunistic application of a burst-mode transfer.

15. The system of claim 1, where the bus is configured to support pushed digital audio transport to the component.

16. The method of claim 6, requesting a bus clock rate increase to effect an opportunistic burst mode transfer that creates the period which no data is sent to the component.

17. The method of claim 6, where a start of the period comprises a completion of a pulled digital audio transport stream.

18. The product of claim 8, where the component comprises an application processor coupled via the bus to audio circuitry, GPS circuitry, wireless networking circuitry, or any combination thereof.

19. The product of claim 8, where the instructions are further configured to cause the processor to request a bus clock rate increase to effect an opportunistic burst mode transfer that creates the period which no data is sent to the component.

20. The product of claim 8, where a start of the period comprises a completion of a pulled digital audio transport stream.

* * * * *